US009451336B2

(12) United States Patent
White

(10) Patent No.: US 9,451,336 B2
(45) Date of Patent: *Sep. 20, 2016

(54) SYSTEM AND METHOD FOR PRESENTING PROGRESSIVELY DOWNLOADED MEDIA PROGRAMS

(71) Applicant: AT&T Intellectual Property I, LP, Atlanta, GA (US)

(72) Inventor: Scott White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/564,945

(22) Filed: Dec. 9, 2014

(65) Prior Publication Data

US 2015/0150049 A1    May 28, 2015

Related U.S. Application Data

(63) Continuation of application No. 13/442,060, filed on Apr. 9, 2012, now Pat. No. 8,930,993, which is a continuation of application No. 11/738,357, filed on Apr. 20, 2007, now Pat. No. 8,171,518.

(51) Int. Cl.
| H04N 5/445 | (2011.01) |
| H04N 21/845 | (2011.01) |
| H04N 7/173 | (2011.01) |
| H04N 21/432 | (2011.01) |
| H04N 21/433 | (2011.01) |
| H04N 21/472 | (2011.01) |
| G11B 27/34 | (2006.01) |
| H04N 5/76 | (2006.01) |

(52) U.S. Cl.
CPC ........... *H04N 21/8456* (2013.01); *G11B 27/34* (2013.01); *H04N 5/76* (2013.01); *H04N 7/17318* (2013.01); *H04N 21/4325* (2013.01); *H04N 21/4331* (2013.01); *H04N 21/472* (2013.01)

(58) Field of Classification Search
CPC .......... H04N 21/84; H04N 21/23439; H04N 21/4331; H04N 21/8456; H04N 21/25808
USPC ........................................................ 725/38
See application file for complete search history.

(56) References Cited

U.S. PATENT DOCUMENTS

| 6,757,906 | B1 | 6/2004 | Look | |
| 6,920,110 | B2 | 7/2005 | Roberts et al. | |
| 7,475,349 | B2 | 1/2009 | Wagner et al. | |
| 2006/0092938 | A1 | 5/2006 | Gentrix | |
| 2006/0168227 | A1 | 7/2006 | Levine et al. | |
| 2007/0130210 | A1* | 6/2007 | Park | H04L 29/06027 |
| 2008/0189745 | A1 | 8/2008 | Hassell | |
| 2008/0195743 | A1* | 8/2008 | Brueck | H04L 29/06027 709/231 |
| 2008/0228821 | A1 | 9/2008 | Mick | |

* cited by examiner

*Primary Examiner* — Jivka Rabovianski
(74) *Attorney, Agent, or Firm* — Guntin & Gust, PLC; Joseph Hrutka

(57) ABSTRACT

A system and method for presenting progressively downloaded media programs is disclosed. A system that incorporates teachings of the present disclosure may include, for example, obtaining an estimated length of a media program where the estimated length is based on a plurality of different reported lengths of the media program in reported media program information, presenting at a display device a portion of the media program while it is being delivered by a media delivery system via a progressive download, and enabling bookmark and chaptering functions for the media program based on the estimated length of the media program until a true time index is generated using an index file at an end of the progressive download of the media program. Other embodiments are disclosed.

19 Claims, 3 Drawing Sheets

SYSTEM AND METHOD FOR PRESENTING PROGRESSIVELY DOWNLOADED MEDIA PROGRAMS

CROSS-REFERENCE TO RELATED APPLICATIONS

This application is a continuation of and claims priority to U.S. patent application Ser. No. 13/442,060, filed Apr. 9, 2012, which is a continuation of U.S. patent application Ser. No. 11/738,357, filed Apr. 20, 2007, which issued on May 1, 2012 as U.S. Pat. No. 8,171,518, the disclosures of which are incorporated herein by reference in their entirety.

FIELD OF THE DISCLOSURE

The present disclosure relates generally to progressively downloaded media programs and more specifically to a system and method for presenting progressively downloaded media programs.

BACKGROUND

Progressively downloaded media programs provide end users the ability to start the presentation of a media program before the media program is completely downloaded. More specifically, downloaded portions of the media program are used to support initial playback while the remainder of the media program continues downloading in the background. During playback of progressively downloaded media programs stored in common audio/video container formats, some playback features may be limited or unavailable. This occurs because the index file for common audio/video file container formats is generally included at the end of the container file. The index file generally contains critical information about the media program and as a result, certain playback features dependent on information in the index file are generally unavailable during presentation of progressively downloaded media programs.

A need therefore arises for a system and method for presenting progressively downloaded media programs.

DETAILED DESCRIPTION

Embodiments in accordance with the present disclosure provide a system and method for presenting progressively downloaded media programs.

In a first embodiment of the present disclosure, a computer-readable storage medium in a Set-Top Box (STB) can have computer instructions for determining an approximate length of a media program from a catalog of media programs, presenting at a media device coupled to the STB a portion of the media program while it is being delivered to the STB by a media delivery system, and adjusting the presentation of the portion of the media program according to the approximate length.

In a second embodiment of the present disclosure, a Set-Top Box (STB) can have a controller element to determine a length of a media program from a catalog of media programs and present according to the length a portion of the media program while it is being delivered to the STB by a media delivery system.

In a third embodiment of the present disclosure, a method can involve presenting a portion of a media program prior to its complete delivery according to a length of the media program determined from one or more reported lengths for the media program.

In a fourth embodiment of the present disclosure, a Set-Top Box (STB) can have a controller element that presents a portion of a media program prior to its complete delivery with one or more active trick play functions.

In a fifth embodiment of the present disclosure, a method can involve retrieving playback information from each of a plurality of media programs, receiving a request to deliver a select one of the plurality of media programs, and delivering the playback information of the selected media program before or while it is being delivered.

Figure 1:
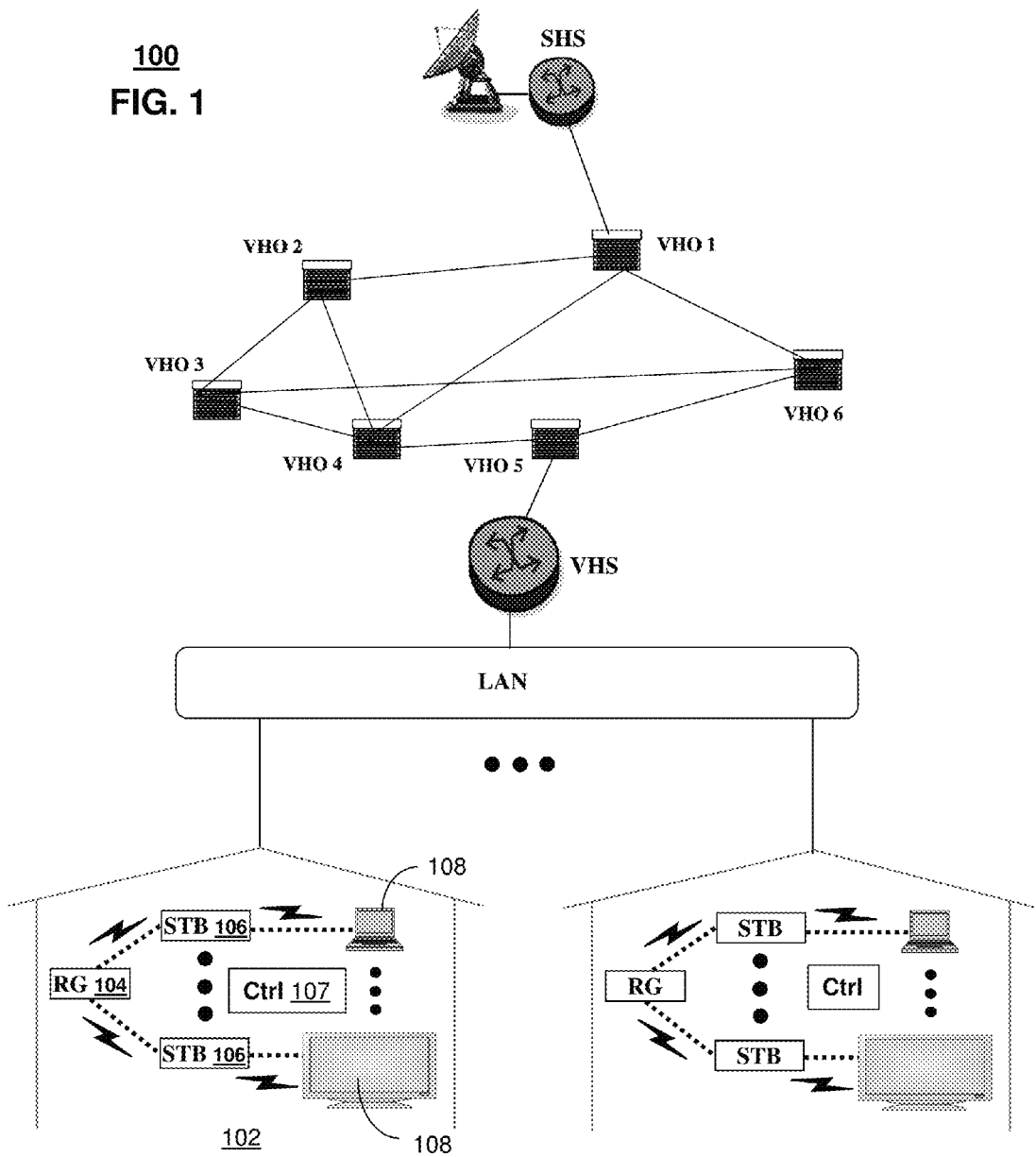
FIG. 1 depicts an exemplary embodiment of a communication system.

FIG. 1 depicts an exemplary embodiment of an IPTV communication system 100 having portions that can be configured as a media delivery system for delivery of progressively downloaded media programs. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG) that distributes broadcast signals to receivers such as Set-Top Boxes (STBs) 106 which in turn present broadcast selections to media devices 108 such as computers or television units managed in some instances by a media controller 107 (e.g., an infrared or RF remote control).

Unicast traffic can also be exchanged between the STBs 106 and the subsystems of the IPTV communication system 100 for services such as delivery of media programs to STBs 106. Although not shown, the aforementioned multimedia system can also be combined with analog broadcast distributions systems.

An STB 106 operating in the system 100 can comprise a mass storage system, a controller element, and a network interface. The mass storage system can utilize common storage technologies (e.g., hard disk drives, flash memory, etc.) to store one or more media programs in one or more databases managed by the controller element. The controller element can utilize common video processing technologies (e.g., MPEG 3 or 4, H.264, high definition TV, standard definition TV, etc.) to present and manage programs on the media device 108. The network interface can utilize common networking technologies (e.g., LAN, WLAN, TCP/IP, etc.) to manage communication with the gateway 104 and the IP network via wireline (e.g., Ethernet, or cable) and/or wireless communications (e.g., WiFi).

Figure 2:
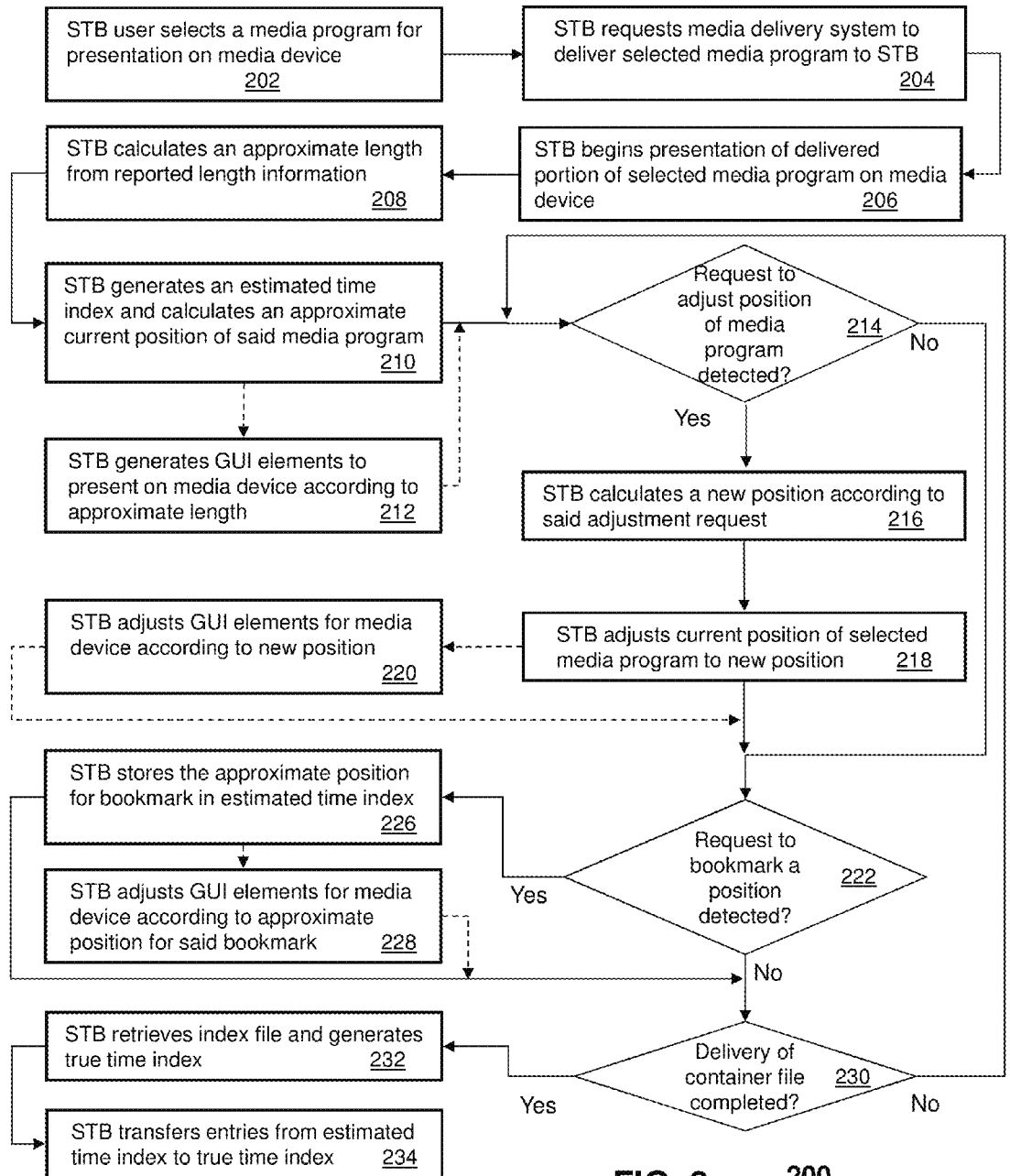
FIG. 2 depicts an exemplary method operating in portions of the communication system.

FIG. 2 depicts an exemplary method 200 operating in portions of the communication system 100. Method 200 has variants as depicted by the dashed lines. It would be apparent to an artisan with ordinary skill in the art that other embodiments not depicted in FIG. 2 are possible without departing from the scope of the claims described below.

Method 200 begins with step 202 in which a user selects a media program for progressive download from a media delivery system. For example, a user can select via an interface of the STB 106, such as a remote control, a media program from a catalog of media programs stored in one or more portions of the system 100. The catalog can be presented to the user on the display of the media device 108. Media programs can include any type of multimedia presentation including audio, visual, or audio/visual presentations. For example, the media program selected can comprise an audio-only program such as music, a visual-only program such as a video bulletin board or a collection of still pictures from a picture album, or an audio/visual program such as a movie or television program.

In response to the user selecting a media program, the STB 106 in step 204 can request the media delivery system to deliver the selected media program to the STB 106. Once an amount of the media program sufficient to support playback is delivered, the STB 106 in step 206 can begin a presentation of the delivered portion of the media program. The STB 106 can use common progressive download methods to determine whether sufficient amounts of the media program have been delivered to the STB 106 to support playback without interruption.

In step 208, the STB 106 can determine a length or approximate length of time of the media program. The approximate length of time of the media program can be determined from media program information reported in one or more locations accessible via the system 100. For example, a media delivery system catalog of movies typically provides for each movie a title, a description, actors or directors, a rating, and a reported length of time for the movie. In step 208, the STB 106 can be configured to utilize this reported information to determine an approximate length for the movie. In another example, the STB 106 can be configured to access other information sources, such as websites or databases, to locate media program information. In one embodiment, the program information source can include pre-processing of the media program prior to the progressive download. For example, the media program can be scanned to determine the relevant information. In another example, an index file of a file header of the media program can be analyzed and the relevant information extracted therefrom.

In some instances, the STB 106 can be configured to analyze multiple reported lengths for the media program and, for example, calculate an average approximate length. Similarly, chapter or track information for a media program can also be downloaded from one or more databases accessible to the system 100 without the need to access the index file of the media program. Although the approximated length for the media program may not coincide with the actual length of the media program, the approximated length can allow the STB 106 to generate other approximated time information to allow users to access playback features normally requiring time information from the index file.

Once the STB 106 calculates an approximate length for the media program, the STB 106 in step 210 can calculate the approximate current position of the media program in relation to the length of the media program and/or generate an estimated time index to assist in managing and navigating the media program. An estimated time index can be used by the STB 106 to manage playback and navigation of the media program. In one embodiment, the estimated time index is utilized for playback and navigation of the media program until a true time index can be generated using the index file received at the end of the progressive download. The STB 106 can use the estimated time index to store information regarding the approximate length, the approximate current position, the approximate downloaded amount of the media program, and other time positions within the media program. For example, the STB 106 can use the estimated time index to store estimated chapter or bookmark positions to allow the user to navigate from one portion of the media program to another.

The STB 106 can utilize the estimated time index for management of the playback and navigation of the media program prior to receipt of any index file in the header file of the progressively downloaded media programs of audio/visual media container file formats (e.g., Audio Video Interleave (AVI)). The index file can include information, such as media program length and track or chapter information, that can be used for functions such as bookmarking (stopping playback of a media program and resuming at the same position at a later time), trick play (fast-forward, rewind, skip forward or backwards a certain amount of time, chapter skip) and/or displaying selectable GUI elements and commands, including trick play GUI elements, volume controls, playbars, or other playback status bars.

Estimated time index entries can be stored in several ways. In one embodiment, time-based positions can be transformed into approximate frame counts. These approximate frame counts for the time-based positions, such as chapters or bookmarks, can be determined by approximating a total frame count based on the approximated length and the detected frame rate, and determining an approximate frame count corresponding to each time-based position. For example, where a frame count of 175,000 frames corresponds to approximately a 2 hour movie, then about 24 frames will correspond to one second. Therefore, if a chapter position begins at 5 minutes from the beginning of the movie, a frame count of 7200 frames can be associated with the chapter and stored in the estimated time index. The STB 106 can later access the chapter position by accessing the estimated time index and retrieving the associated frame count. Alternatively or in combination, the estimated time index entries can be time-based and converted to frame counts whenever processing is required.

The approximate current position can also be calculated in several ways. For example, the approximate current position can be determined by monitoring the elapsed time since the start of playback of the media program. In another example, the approximate current position can be calculated by comparing the current frame count to an approximated total frame count for the entire media program, based on the approximated length and a detected frame rate. Although not shown, an approximate downloaded amount of the media program can be similarly calculated.

The approximate current position, the approximate length, and/or the estimated time index can be used to generate a GUI to display on the media device 108. Separately, or in combination with step 210, the STB 106 in step 212 can generate GUI elements to display the current position for the media program using the approximated time information. For example, the approximate current position and the approximate total time can be used to generate a graphical playbar in the GUI. The graphical playbar can also be configured to indicate an approximate downloaded amount of the media program or to indicate chapter or bookmark positions in the media program. In another example, the approximate current position, the approximate total time, and/or the estimated time index can be used to generate a numerical display in the GUI of the approximate current position, the approximate elapsed time, the approximate remaining time, and/or approximate chapter or track information for the media program.

As previously discussed, the approximated time information can be used to allow users to access functions such as bookmarking and trick play even though the index file has not been downloaded. As shown in method 200, a STB 106 can use the estimated time index to manage playback and navigation for the media program as shown in steps 214-228.

In step 214, the STB 106 can monitor for a user request for trick play (i.e., adjust position) of the media program. If a request for trick play is detected, then the STB 106 can calculate a new position for the media program in step 216. The STB 106 can calculate the new position in several ways. For example, in response to a request to skip ahead or advance the media program 5 seconds, the STB 106 can determine the approximate additional number of frames associated with a 5 second shift and add the approximate additional number of frames to the current frame count to determine the new position. In another example, in response to a request to skip ahead to a chapter position stored in the estimated time index, a frame count associated with the new position can be retrieved by accessing the estimated time index and retrieving the frame count associated with the selected chapter. In yet another example, where a new time-based position falls between two or more identified time-based positions associated with frame counts, such as chapters, the frame count to associate with the new position can be interpolated.

Once the new position is calculated, the STB 106 in step 218 can resume presentation of the media program at the new position. In one embodiment, separately or in combination with step 218, the STB 106 in step 220 can also adjust the GUI elements to reflect the new position, as previously discussed.

In some instances, a request for trick play can result in calculation of a new position beyond the approximate length of the media program or the approximate available amount of the media program. In the case of a calculated new position between the approximate downloaded amount of the media program and the approximate end of the media program, the STB 106 can be configured to pause playback, allow the progressive download to reach the calculated new position in the media program, and resume playback once a sufficient amount of the media program is downloaded to prevent interruption of playback. Alternatively or in combination, the STB 106 can be configured to generate an error message or to select alternate positions in the media program, such as the beginning, the end, or any other position currently available for playback.

Separately or in combination with step 214, the STB 106 in step 222 can monitor for requests to bookmark a position in the media program being presented. A request for a bookmark can be generated in several ways. For example, a bookmark request can be generated when playback is halted by a user for later playback. Alternatively, bookmark requests can be made during playback, allowing the user to mark a position in the media program to allow a user to return to the marked position in the media program. To bookmark a current position, the approximate current position of the media program can be stored for later access as in step 226. For example, the STB 106 can store a frame count for the bookmarked position in the estimated time index. The STB 106 can access the estimated time index at a later time and adjust the current position for the media program, as discussed in steps 216 and 218. In one embodiment, the STB 106 in step 228 can adjust the GUI to indicate the availability and/or location of bookmarks. For example, the GUI can display the location of bookmarked positions in a playbar.

Separately, or in combination with steps 214-228, the STB 106 can also monitor in step 230 for completion of the delivery of the container file. Once delivery of the container file to the STB 106 is complete, the STB 106 in step 232 can retrieve the index file and generate the true time index for the media program. Subsequently, the STB 106 can manage access and navigation of the media program using the true time index. The estimated time index can then be discarded by the STB or otherwise disposed of. If on the other hand, the delivery of the container file is not complete and/or the STB 106 has not received an index file, then the STB can continue to manage and navigate the media program based upon the estimated time index, as recited back in steps 214-228.

In one embodiment, the STB 106 in step 234 can transfer at least some information from the estimated time index to the true time index prior to discarding of the estimated time index. For example, bookmarks in the estimated time index can be automatically transferred to the true time index. The STB 106 can also be configured to compare the true time index and the estimated time index to more accurately determine the proper position for transferred positions from the estimated time index, such as bookmarks. For example, if the actual and approximate lengths for a media program are different, the position of the bookmark in the true time index can be adjusted to more accurately reflect its position between the end and beginning of the media program.

Upon reviewing the aforementioned embodiments, it would be evident to an artisan with ordinary skill in the art that said embodiments can be modified, reduced, or enhanced without departing from the scope and spirit of the claims described below. For example, in some embodiments the media delivery system could be configured to concurrently upload and analyze the media program file in order to locate the index file information and provide it to the STB prior to completing download of the media program. In another embodiment, media programs in a catalog of a media delivery system can be preloaded by the media delivery system, where they can be analyzed to retrieve the index file information. In yet another embodiment, where index file information is retrieved during pre-processing, additional pre-processing can be used to reformat the media program into a format more compatible with the media device 108, such as a High or Standard Definition media format, an adaptable media format for portable devices, or an Internet browser media format. These are but a few examples of modifications that can be applied to the present disclosure without departing from the scope of the claims stated below. Accordingly, the reader is directed to the claims section for a fuller understanding of the breadth and scope of the present disclosure.

Figure 3:
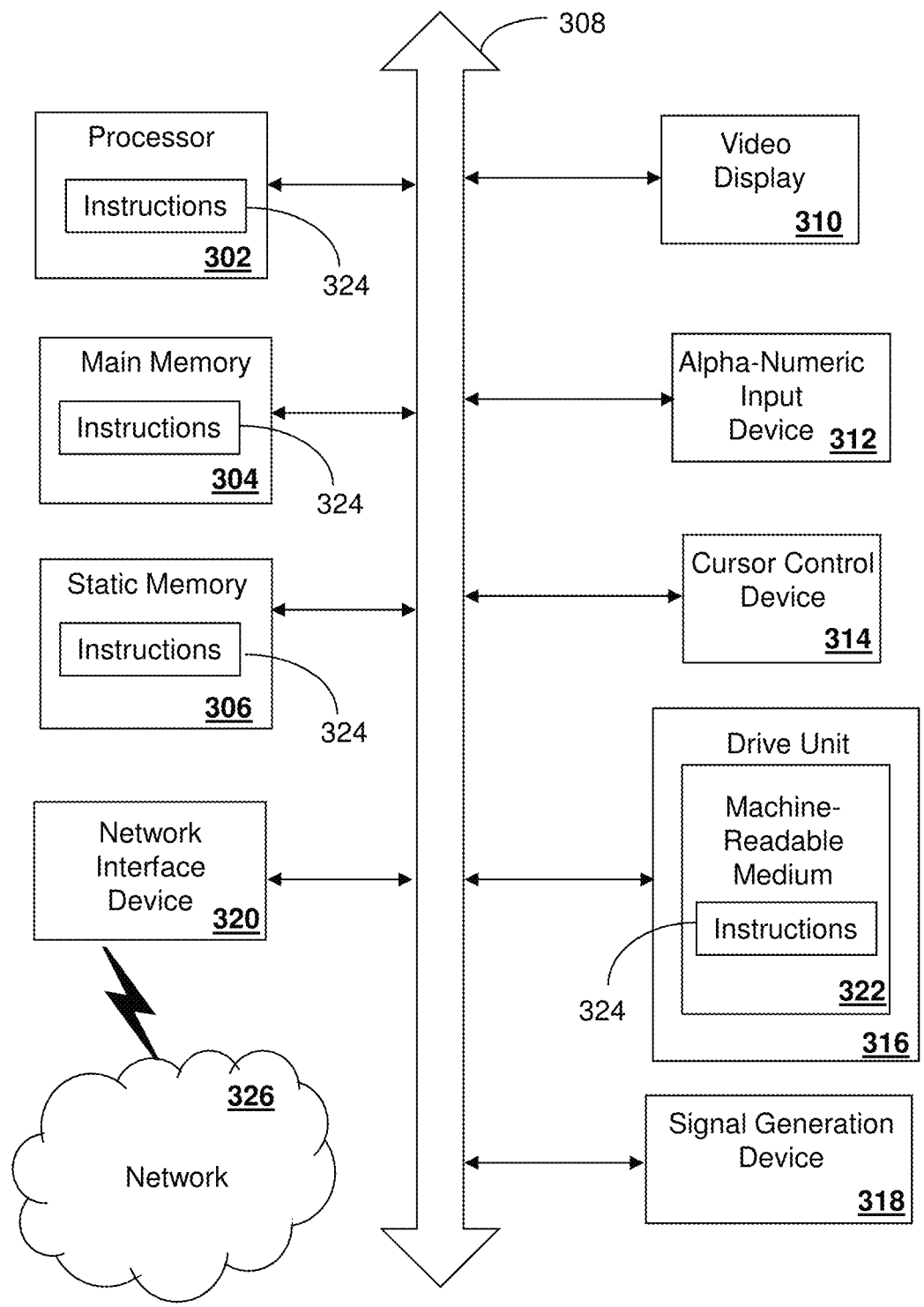
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a processing system including a processor; and
a memory that stores executable instructions that, when executed by the processing system, facilitate performance of operations, comprising:
obtaining an estimated length of a media program, wherein the estimated length is based on a plurality of different reported lengths of the media program in reported media program information;
presenting, at a display device in communication with the at least one processor, a portion of the media program while the media program is being delivered over a network to the communications device by a media delivery system via a progressive download;
enabling a bookmark function for the media program based on the estimated length of the media program;
receiving a bookmark request associated with the bookmark function;
determining, according to the estimated length, an adjustment of a graphical user interface and the portion of the media program presented thereby responsive to the bookmark request; and
adjusting the presentation of the portion of the media program according to the adjustment.

2. The communication device of claim 1, wherein the operations further comprise:
downloading a true time index from an end of the progressive download;
comparing the true time index with an estimated time index generated based on the estimated length; and
transferring bookmark request to the true time index based on the comparing and based on a time differential between the estimated length of the media program and an actual length of the media program.

3. The communication device of claim 2, wherein only a portion of the bookmark request is transferred to the true time index.

4. The communication device of claim 1, wherein the reported media program information for the media program is obtained from catalogs of media programs, and
wherein the estimated length of the media program is different from an actual length of the media program.

5. The communication device of claim 1, wherein the operations further comprise estimating a number of program frames of the media program from the estimated length as an estimated number of program frames, and wherein the reported media program information is not obtained from a file header of the media program.

6. The communication device of claim 5, wherein the operations further comprise adjusting a presentation of the portion of the media program according to the estimated number of program frames.

7. The communication device of claim 1, wherein the display device is integrated with the processor and the memory in a mobile device.

8. The communication device of claim 1, wherein the operations further comprise establishing voice communication services.

9. The communication device of claim 1, wherein the obtaining of the estimated length of the media program is based utilizing the plurality of different reported lengths of the media program in the reported media program information.

10. A method, comprising:
obtaining, by a processing system comprising a processor, an estimated length of a media program, wherein the estimated length is based on a plurality of different reported lengths of the media program;
presenting, by the processing system, at a display device, a portion of the media program while the media program is being delivered over a network to the system by a media delivery system via a progressive download;
receiving, by the processing system, a bookmark position indicator and creating a bookmark based on the estimated length;
receiving, by the processing system, an index file for the media program at an end of the progressive download;
comparing, by the processing system, a true time index generated from the index file with an estimated time index generated from the estimated length;
transferring, by the processing system, the bookmark position indicator to the true time index based on the comparing and based on a time differential between the estimated length of the media program and an actual length of the media program; and
updating, by the processing system, the bookmark position indicator with the time differential.

11. The method of claim 10, further comprising enabling playback and navigation functions for the media program based on the estimated length of the media program until the true time index is generated.

12. The method of claim 11, wherein the index file is received by the processor at an end of the progressive download of the media program.

13. The method of claim 10, wherein the display device is integrated with the processor in a mobile device.

14. The method of claim 10, further comprising:
estimating a number of program frames of the media program from the estimated length; and
adjusting a presentation of the portion of the media program according to the estimating.

15. The method of claim 10, wherein, upon receiving the bookmark position indicator, a bookmark is created based on a selected portion of the media program and the estimated length.

16. The method of claim 15, further comprising providing a graphical user interface to control the presenting and the receiving the bookmark;
determining, according to the estimated length, an adjustment of the graphical user interface and the portion of the media program presented thereby responsive to receiving the bookmark position indicator; and adjusting the presentation of the portion of the media program according to the adjustment.

17. A server, comprising:
a processing system including a processor; and
a memory that stores executable instructions that, when executed by the processing system, facilitate performance of operations, comprising:
  obtaining a plurality of different reported lengths of a media program in reported media program information;
  determining an estimated length of the media program based on the plurality of different reported lengths of the media program; and
  providing the estimated length of the media program to a communication device for enabling a chapter functions for the media program based on the estimated length of the media program until a true time index is generated using an index file at an end of a progressive download of the media program.

18. The server of claim 17, wherein operations further comprise estimating a number of program frames of the media program from the estimated length, and wherein the chapter functions are adjusted based on the estimating.

19. The server of claim 17, wherein the communication device comprises a mobile device capable of voice communications, and
  wherein the reported media program information is obtained from an online database including information related to media programs.

* * * * *